(No Model.)
A. E. SMITH.
EGG LIFTER.
No. 433,546. Patented Aug. 5, 1890.
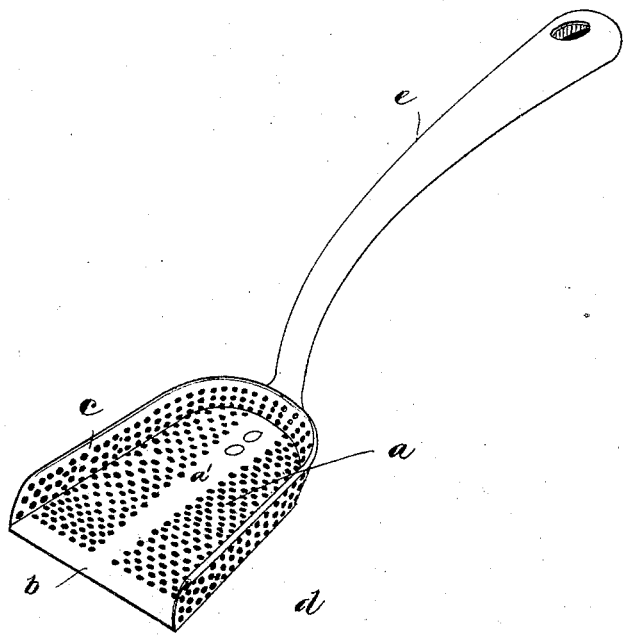
Witnesses
Chas. Welch
Joshua Scott
Inventor
Ann E. Smith
By [signature]
her atty.

UNITED STATES PATENT OFFICE.

ANN E. SMITH, OF SPRINGFIELD, OHIO.

EGG-LIFTER.

SPECIFICATION forming part of Letters Patent No. 433,546, dated August 5, 1890.

Application filed March 28, 1889. Serial No. 305,165. (No model.)

*To all whom it may concern:*

Be it known that I, ANN E. SMITH, a citizen of the United States, residing at Springfield, in the county of Clark and State of Ohio, have invented certain new and useful Improvements in Egg-Lifters, of which the following is a specification.

The object of my invention is to produce an egg-lifter especially adapted for lifting poached eggs from the receptacle in which they are cooked. With the ordinary devices in use considerable difficulty is experienced in lifting poached eggs when cooked in an ordinary receptacle (the most common way) without breaking the egg or lifting a considerable amount of the water in which the egg is cooked, either of which is objectionable.

By my improved device, herein described, means are furnished by which the eggs may be readily detached one from the other in the cooking-receptacle and readily lifted from the said receptacle, free from the water in which they are cooked and without breaking the yelk or other parts.

In the accompanying drawing, which forms a part of this specification, the figure is a perspective view of a device embodying my invention.

In accomplishing the object of my invention it is desirable that the parts of the device which come in contact with the egg should be, as far as possible, a plain, smooth surface, means also being provided for permitting the water from which the egg is lifted to be drained therefrom. In my improved device I use an egg-holding receptacle consisting of a bottom *a*, of a single piece of sheet metal, perforated throughout the greater portion of its surface and provided with a solid cutting-edge *b* at the front thereof. This bottom *a* is surrounded (save for the cutting-edge *b*) by a rim *c*, of substantially uniform height, of perforated metal similar to that composing the bottom, and preferably formed in one piece with said bottom by stamping or otherwise. The rim or flange *c*, extending around the bottom *a*, is provided at the top with a bead *d*, which may be formed by folding the metal over in a well-known manner. A handle *e*, of well-known construction, preferably of wire or sheet metal, is secured to the bottom *a* by riveting or otherwise. The perforations in the bottom *a*, I preferably arrange as shown in the figure, so that a plain strip of metal *a'*, free from perforations, extends backwardly from the cutting-edge *b* to the point where the handle *e* is attached, thus securing greater strength and rigidity to the parts.

In operation the cutting-edge *b* is used to separate the eggs in the cooking-receptacle— that is, to detach them one from the other— after which, by sliding the bottom or base-piece *a* in under the egg, the same may be readily lifted from the cooking-receptacle without breaking and free from the water in which it is cooked.

In order to obtain successful results, the sheet-metal base should be of a single piece with a smooth upper surface, and the perforations therein small and round to prevent the egg lifted thereby from being scratched and torn, and at the same time to permit the water to drain readily therefrom.

Having thus described my invention, I claim—

As an article of manufacture, an egg-lifter composed of a single piece of perforated metal with a straight solid cutting-edge and a perforated rim of substantially uniform height extending around the same, except at the said cutting-edge, the bottom being formed with a central strip of imperforated metal extending backwardly from the solid or plain strip which forms the cutting-edge, and a handle secured to said central strip, whereby a direct solid connection is formed from said handle to the bottom and cutting-edge, while the rim and parts adjacent thereto are left perforated, substantially as specified.

In testimony whereof I have hereunto set my hand this 21st day of March, A. D. 1889.

ANN E. SMITH.

Witnesses:
CHAS. I. WELCH,
PAUL A. STALEY.